United States Patent
Hsieh et al.

(10) Patent No.: US 7,848,622 B2
(45) Date of Patent: Dec. 7, 2010

(54) OPTICAL STORAGE MEDIUM FOR REAL-TIME RECORDING AVI-FORMAT FILE AND METHOD THEREOF

(75) Inventors: Ming-Fu Hsieh, Taipei (TW);
Chun-Tang Weng, Kaohsiung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1133 days.

(21) Appl. No.: 11/469,096

(22) Filed: Aug. 31, 2006

(65) Prior Publication Data

US 2007/0230922 A1 Oct. 4, 2007

(30) Foreign Application Priority Data

Mar. 30, 2006 (TW) .............................. 95111136 A

(51) Int. Cl.
*H04N 5/00* (2006.01)
(52) U.S. Cl. .................... 386/126; 386/124; 386/125; 386/111; 386/116; 386/52; 369/59.25

(58) Field of Classification Search ............... 386/126, 386/124, 125, 111, 116, 52; 369/59.25
See application file for complete search history.

(56) References Cited

U.S. PATENT DOCUMENTS

| 6,837,594 | B2 * | 1/2005 | Paquette et al. | 362/653 |
| 7,539,399 | B1 * | 5/2009 | Tsujii et al. | 386/111 |
| 2002/0093571 | A1 * | 7/2002 | Hyodo | 348/220 |
| 2002/0126597 | A1 * | 9/2002 | Kim | 369/47.24 |
| 2005/0165857 | A1 * | 7/2005 | Naka et al. | 707/200 |
| 2006/0039678 | A1 * | 2/2006 | Naka et al. | 386/95 |
| 2006/0279628 | A1 * | 12/2006 | Fleming | 348/143 |

* cited by examiner

*Primary Examiner*—Thai Tran
*Assistant Examiner*—Helen Shibru
(74) *Attorney, Agent, or Firm*—J.C. Patents

(57) ABSTRACT

A method of real-time recording a file with an AVI format on an optical storage medium is provided, in which the optical storage medium is a write-once type medium and employs a file system without multi-section record. According to the method, in the AVI format, a dummy chunk is used to cover a linking loss area generated between every continuous recording area, thus avoiding the AVI format being destroyed by the linking loss area.

17 Claims, 4 Drawing Sheets

OPTICAL STORAGE MEDIUM FOR REAL-TIME RECORDING AVI-FORMAT FILE AND METHOD THEREOF

CROSS-REFERENCE TO RELATED APPLICATION

This application claims the priority benefit of Taiwan application serial no. 95111136, filed on Mar. 30, 2006. All disclosure of the Taiwan application is incorporated herein by reference.

BACKGROUND OF THE INVENTION

1. Field of Invention

The present invention relates to a method of real-time recording a multimedia file. More particularly, the present invention relates to a method of real-time recording an AVI-format file on an optical storage medium.

2. Description of Related Art

AVI is a windows media file format for sound and dynamic pictures used in RIFF specification developed by Microsoft Corporation. AVI is the abbreviation of Audio Video Interleaved, and RIFF is the abbreviation of Resource Interchange File Format.

First, the RIFF specification is described. As shown in FIG. 1A, the RIFF file format comprises an "RIFF", a length, an identifier and a data region. The "RIFF" is a four-character code (FCC). As the byte sequence of the Microsoft operation system employs a little-endian method, if the codes of the four-character code "RIFF" are represented as 52 49 46 46 in hexadecimal, the sequence of writing into the file is 46 46 49 52. For the convenience of recognition, the following four-character codes are all marked with double quotation marks. The RIFF file format includes: first, a four-character code "RIFF" of 4 bytes indicating that this is a RIFF file; next, 4 bytes indicating the length of the RIFF file; then, the four-character code of 4 bytes serving as the identifier to indicate the data type (such as AVI or WAVE); and last, the data region being used for storing actual data. It should be noted that the value recorded in the length field is the length of the actual data (i.e. the length of the data region) plus the length of the identifier field (i.e. 4 bytes).

Additionally, the RIFF specification adopts two types of data format, namely list and chunk, and the list/chunk can further nest other lists/chunks. As shown in FIG. 1B, a list format comprises a "LIST", a length, an identifier and a data region. "LIST" is a four-character code indicating that this is a list. The value recorded in the length field is the length of the data region plus the length of the identifier field. The identifier is, for example, a four-character code such as "hdrl" and "movi", indicating the data type. Similarly, a chunk format comprises an identifier, a length and a data region. The identifier is, for example, a four-character code such as "idx1", indicating the data type. The length recorded in the length field is the length of the data region plus the length of the identifier field.

Next, an AVI file format is described. AVI is a windows media file format using the RIFF specification. As shown in FIG. 2A, the AVI file format includes: first, the four-character code "RIFF" indicating that this is an RIFF file; next, len1 indicating the length of this file; then, the four-character code "AVI" indicating that this is an AVI file, wherein the four-character code containing space is legal; and last, the data region being used for storing actual AVI data. Usually, the part preceding the data region is called the header. For example, a header 20 of the AVI file format comprises an "RIFF", a length lent and an identifier "AVI". Further, the data region of the AVI file format comprises two lists 21, 22 and an optional chunk 23. The format of the list 21 comprises a "LIST", a length len2, an identifier "hdrl" and an HDRL data region (for storing every header data of digital audio/video data). The format of the list 22 comprises a "LIST", a length len3, an identifier "movi" and an MOVI data region (for storing the above-mentioned digital audio/video data). The format of the chunk 23 comprises an identifier "idx1", a length len4 and an IDX1 data region (for storing index data used for fast-forward, rewind, etc.).

Additionally, the file system of an optical disc is described below, taking ISO 9660 as an example. The ISO 9660 file system allows a file to be constituted of one or more discrete fragments. In the file system, each file fragment has a multi-extent bit to indicate whether the fragment is the last fragment of the file. If the storage medium space used by the file is continuous and sequential, the file has only one fragment, and the multi-extent bit in the file system is 0. If the storage medium space used by the file is discrete, the file has multiple fragments, and the file system is used to connect the discrete fragments into one logically continuous file, which is the recording manner of a multi-section file.

In the case of real-time recording an AVI-format file on an optical storage medium and adopting an optical disc file system without the multi-section record, the storage medium space used by a file must be continuous and sequential. In addition, the file has only one fragment and does not need to lookup the file system for the addresses of the other discrete fragments. As the list 22 is used for storing real-time recorded digital audio/video data, the value in length field len3 of the list 22 cannot be obtained until recording is stopped. Thus the space for recording header of the list 22 (including the "LIST", length field len3 and identifier "movi") must be reserved, and the recorded data are first written into the MOVI data region of the list 22. After recording, the header data related to the recorded digital audio/video data are filled into the header of the list 21.

Additionally, as for a write-once optical storage medium such as DVD+/−R, a linking loss area which data cannot be written into is generated at the end point of each continuous recording, so as to finish the current continuous recording action. Generally, the length of this linking loss area is 2 KB or 32 KB, and all the data read from this area can be regarded as zero. Thus, the linking loss area exists between every continuous recording area. In the above situation, as shown in FIG. 2B, the linking loss area exists between the MOVI data region and the header of the list 22. When a play program or a player is attempting to read the first A/V chunk of list 22, it will get a series of zero because of the linking loss area, and thus incur error.

Since a player locates the start point of the next list/chunk, based on the length of current list/chunk recorded in the header, for an AVI file. If the length recorded in the chunk/list header is not matching the actual length, the AVI file cannot be accurately parsed. Therefore, if this situation is not specifically treated, then the linking loss area produced in the file may destroy the format and the accuracy. Although currently the multi-section record can be used in real-time recording, it writes the list 21 after the list 22 and the chunk 23 and then connects the discrete fragments into a logically continuous section by use of the file system. However, the method of using multi-section record is not popular in the current market and is not fully supported. Or, each recording length of the AVI file is restricted, so as to obtain an accurate AVI-format file during real-time recording, but the method of restricting the length of each recording is not convenient in use.

SUMMARY OF THE INVENTION

An objective of the present invention is to provide a method of real-time recording a file with AVI format on an optical storage medium, so as to resolve the problem that the file format is destroyed when real-time recording on a write-once optical storage medium adopting a file system without multi-section record.

Another objective of the present invention is to provide an optical storage medium for real-time recording a file with AVI format, so as to resolve the problem that the file format is destroyed when real-time recording on a write-once optical storage medium adopting a file system without multi-section record.

A method of real-time recording a file with AVI format on an optical storage medium is provided in the present invention, in which the optical storage medium is a write-once medium and adopts a file system without multi-section record. The AVI format comprises a first list for storing header data and a second list for storing audio/video data. The second list comprises a header and a sub data region, and the length of the sub data region is determined according to the length of recorded audio/video data. According to the method, first the length of the linking loss area generated between every continuous recording area is determined according to the type of the optical storage medium. Next, an area on the storage medium is reserved prior to the recording sub data region. The length of the reserved area is the sum of the first list, the header of the second list and the dummy chunk, and the dummy chunk is larger than the linking loss area. Then, the recording of the audio/video data begins, the recorded audio/video data are written into the sub data region before stopping recording, and the data of the first list, the header of the second list and the dummy chunk are sequentially written into the reserved area after stopping recording. In an embodiment, the identifier of the dummy chunk is a four-character code, for example, "JUNK", such that the content of the dummy chunk is ignored when the play device has read the four-character code.

An optical storage medium for real-time recording a file with an AVI format is further provided in the present invention. As the optical storage medium is a write-once medium and adopts a file system without multi-section record, a linking loss area is generated between every continuous recording area on the optical storage medium. A typical AVI file comprises two lists and an optional index chunk. The first list is followed by the second list (or the header of the second list), and the index chunk follows the second list (or the sub data region of the second list).

The first list is used to store header data related to the audio/video data. The second list comprises a header, a dummy chunk and a sub data region. The dummy chunk is larger than the linking loss area. The sub data region is used to store the recorded audio/video data. The header of the second list is prior to the dummy chunk of the second list, and the dummy chunk of the second list is followed by the sub data region of the second list. The index chunk is used to store the index data related to the audio/video data. In an embodiment, the identifier of the dummy chunk is a four-character code, for example, "JUNK", such that the content of the dummy chunk is ignored when the play device has read the four-character code.

The AVI format of the present invention employs a dummy chunk, such that when writing the first list and the header of the second list after stopping recording, a linking loss area generated between the written data and the previously recorded audio/video data is covered by the dummy chunk, thus maintaining the validity of the entire AVI file. The method has the advantages that there is no need to restrict the length of the each recording or reduce the compatibility of the optical storage medium.

In order to make the aforementioned and other objectives, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A and 2B show the AVI file format, in which FIG. 2B shows a linking loss area generated between the header of the list 22 and the first A/V chunk of the MOVI data region of the list 22.

DESCRIPTION OF EMBODIMENTS

Figure 1A:
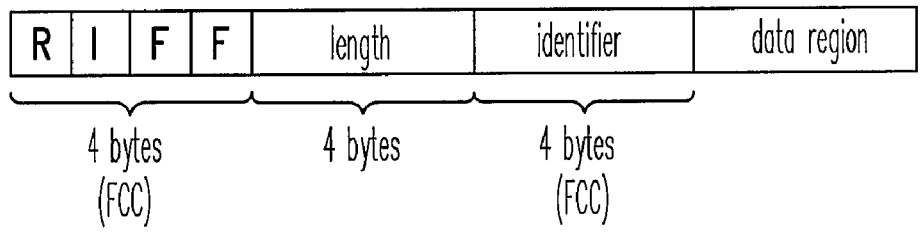
FIG. 1A shows the RIFF file format.
Figure 1B:
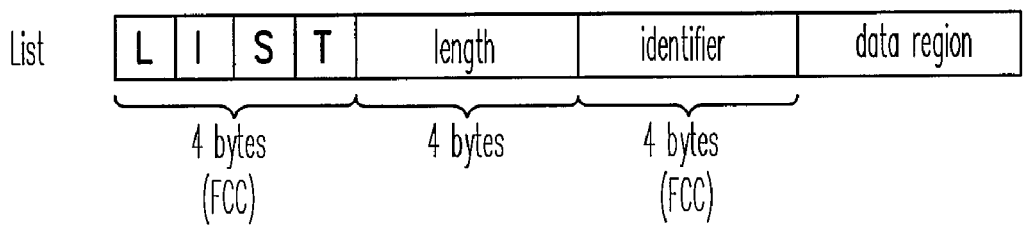
FIG. 1B shows two types of data format of the RIFF.
Figure 1B:
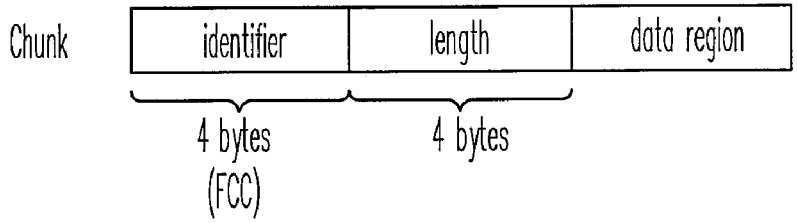
Figure 2A:
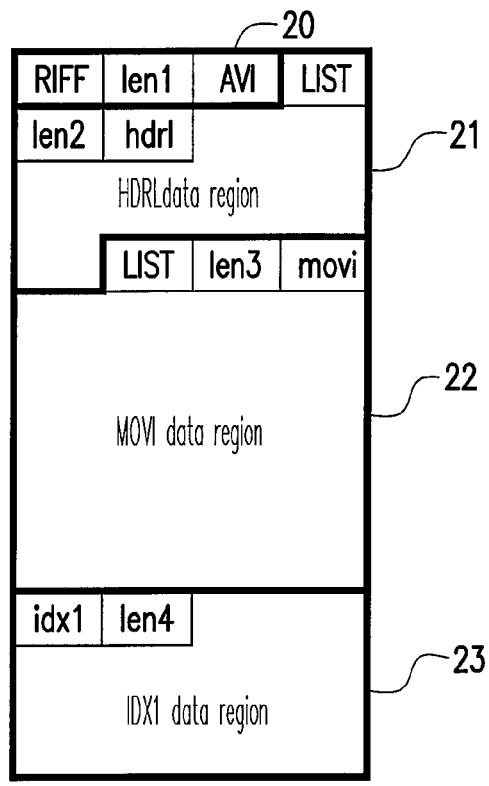
Figure 2B:
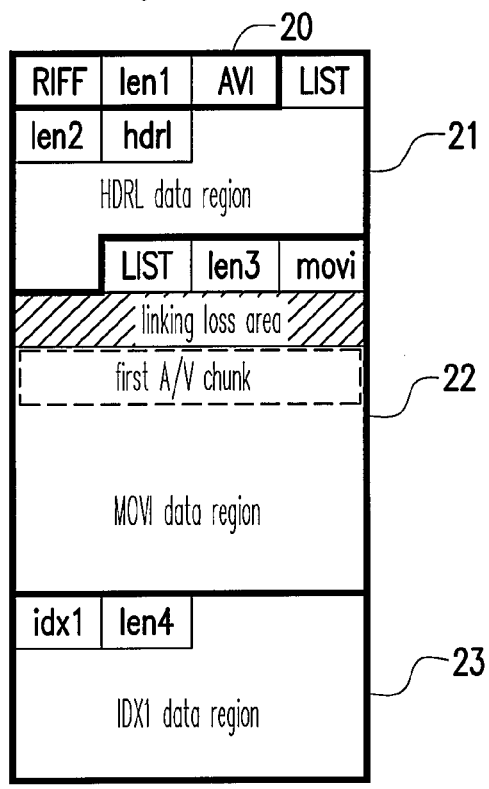
Figure 3:
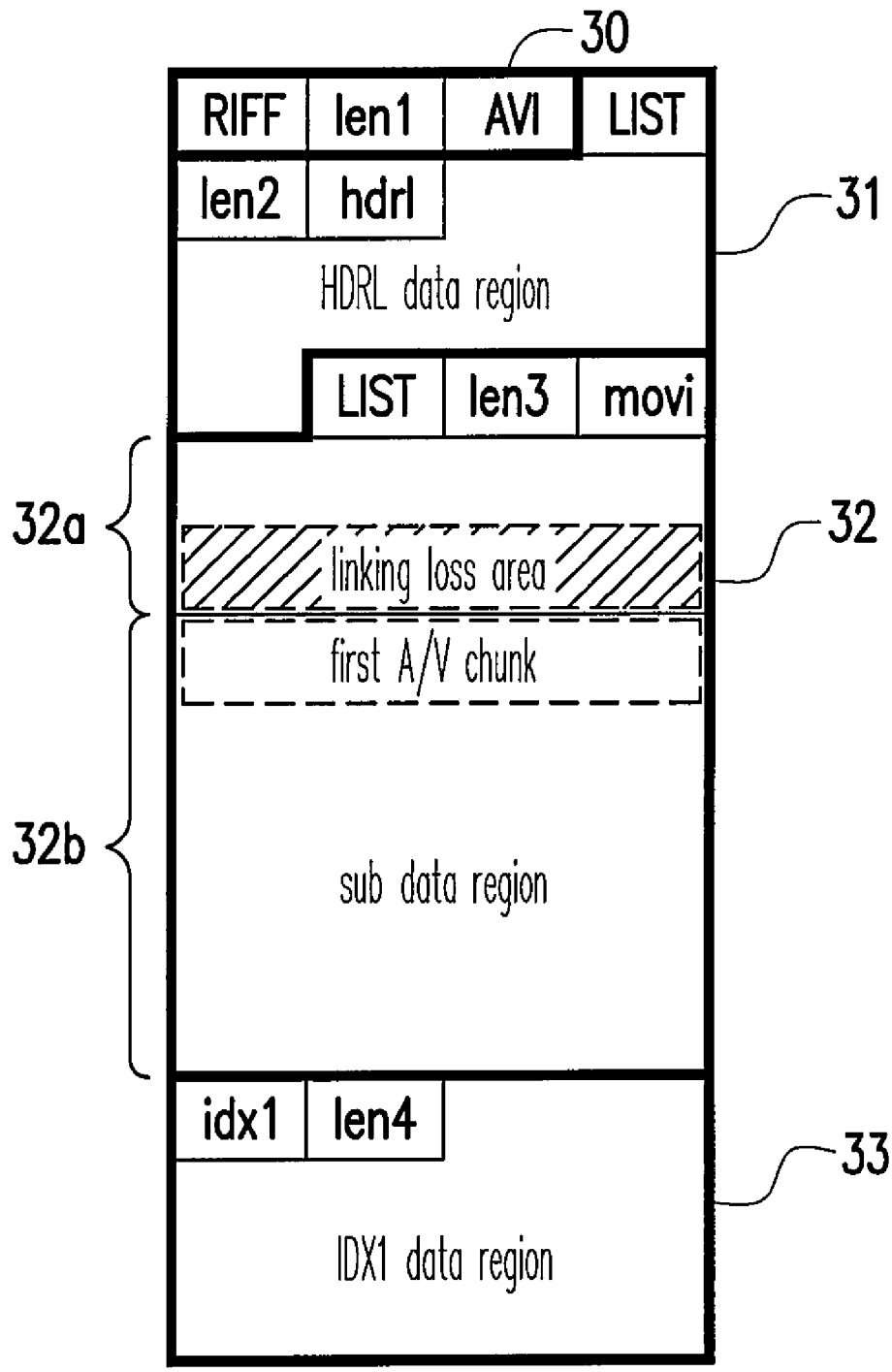
FIG. 3 schematically shows the AVI file format according to an embodiment of the present invention.

FIG. 3 schematically shows an AVI file format (i.e. AVI format) according to an embodiment of the present invention. Referring to FIG. 3, the AVI file format includes: first, a four-character code "RIFF" indicating this is an RIFF file; next, len1 indicating the length of this file; then, a four-character code "AVI" indicating that this is an AVI file; last, the data region being used for storing the actual AVI data, in which the data region comprises a first list 31, a second list 32 and an index chunk 33.

The format of the first list 31 comprises a "LIST", a length field len2, an identifier "hdrl" and an HDRL data region (for storing each header data of the digital audio/video data). The format of the second list 32 comprises a "LIST", a length field len3, an identifier "movi" and an MOVI data region (for storing the above digital audio/video data). The format of the index chunk 33 comprises an identifier "idx1", a length field len4 and an IDX1data region (for storing index data for fast forward, rewind, etc.). The length len2 of the first list 31 can be fixed. The exact value of len3 of the second list 32 cannot be determined before a stop of the real-time recording. The length field len4 of the index chunk 33 can be calculated after the length len3 of the second list 32 is obtained. Therefore, the length fields of len1 and len3 are determined after the length len3 of the second list 32 is obtained.

The difference between the present invention and the traditional AVI format lies in that in the present invention a dummy chunk 32a is inserted between the header of the second list 32 and the former MOVI data region (referred to as "sub data region" below) 32b, and the length of the dummy chunk 32a is larger than that of the linking loss area. According to the RIFF specification, the length of the dummy chunk 32a is the length of the identifier field (i.e. 4 bytes) plus the length of the data region. Since the data region of the dummy chunk 32a is used to cover the linking loss area (i.e., the length of the data region of the dummy chunk 32a is larger than or equal to the length of the linking loss area) to prevent the AVI format from being spoiled, the length of the dummy chunk 32a is larger than or equal to the length of the identifier field (i.e. 4 bytes) plus the length of the linking loss area. Therefore, the MOVI data region of the second list 32 of the present invention comprises a dummy chunk 32a and a sub data region 32b.

Before illustrating the method of real-time recording an AVI-format file of the present invention, some terms are clearly defined first. As the part in the front of each data region is generally called the header, a header 30 of the entire AVI file format comprises an "RIFF", a length len1 and an identifier "AVI". The header of the first list 31 comprises a "LIST", a length len2 and an identifier "hdrl". The header of the second list 32 comprises a "LIST", a length len3 and an identifier "movi". And the header of the index chunk 33 comprises an identifier "idx1" and a length len4. Further, it is known to those skilled in the art that usually the first list 31 is called the HDRL list and the second list 32 is called the MOVI list.

Figure 4:
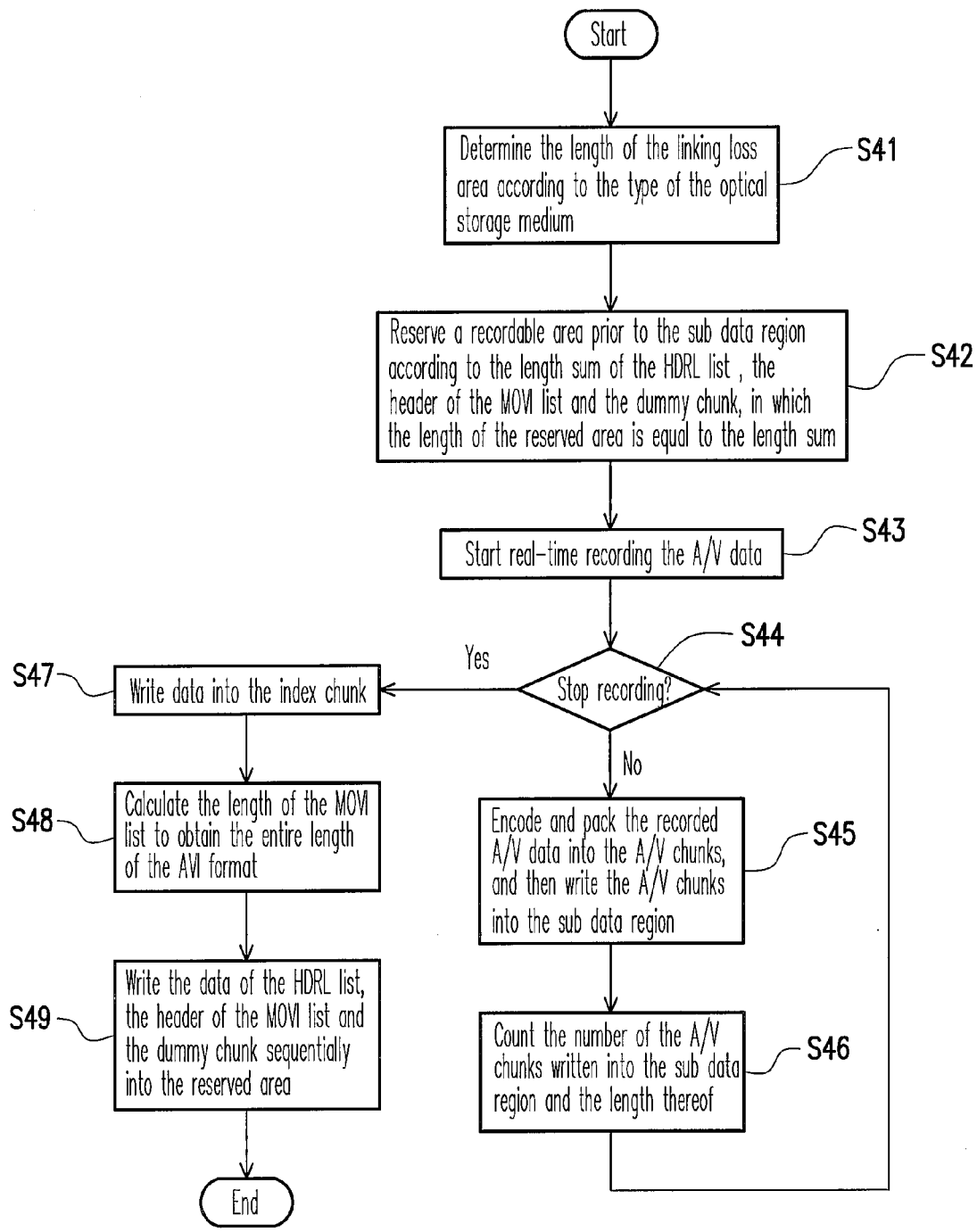
FIG. 4 is a flow chart of the method of real-time recording an AVI-format file on an optical storage medium according to an embodiment of the present invention.

FIG. 4 is a flow chart of the method of real-time recording an AVI-format file on an optical storage medium according to an embodiment of the present invention. The optical storage medium is a write-once medium and adopts a file system without multi-section record. In an embodiment, the write-once optical storage medium is, for example, a DVD+/−R optical disc, and the file system is, for example, ISO 9660 or UDF (Universal Disc Format).

Referring to FIG. 3 and FIG. 4 together, according to the method, first in step S41, the length of the linking loss area generated between every continuous recording area is determined according to the type of the optical storage medium, and generally the length of the linking loss area is 2 KB or 32 KB. Then, in step S42, a recordable area is reserved prior to the sub data region 32b according to the length sum of the HDRL list 31, the header of the MOVI list 32 and the dummy chunk 32a, and the length of the reserved area is equal to the above length sum, wherein the length of the dummy chunk 32a is more than that of the linking loss area. Next, in step S43, the real-time recording the audio/video data begins. Since the length field len3 of the MOVI list 32 cannot be obtained before the real-time recording stops, the recording cannot start from the header, such that the recording of the audio/video data of the sub data region 32b must be performed first.

In step S44, continuously check whether the recording has stopped or not. If the recording has not been stopped, the recorded audio/video data are written into the sub data region 32b in step S45. Generally, the recorded audio/video data are first encoded by the MPEG4 and then packed into AVI chunks, for example, A/V chunks. Next, in step S46, the number of the above A/V chunks and the length thereof are counted. After that, returning to step S44, keep on checking whether the recording is stopped or not.

If it is determined that the recording has been stopped in step S44, the data corresponding to the content of the MOVI data region are written into the index chunk 33, in step S47, which comprises writing the index data into the IDX1 data region and writing the length len4 of the index chunk 33 into the header of the index chunk 33. Next, in step S48, the length len3 of the MOVI list 32 is calculated according to the counting result of step S46, so as to obtain the length len1 of the entire AVI format. Finally, since the values of the length fields of len1 and len3 are obtained, the accurate length information is accordingly written in, so as to create the correct header. Therefore, in step S49, the data of the HDRL list 31, the header of the MOVI list 32 and the dummy chunk 32a are sequentially written into the reserved area.

When the data are written into the HDRL list 31 and the header of the MOVI list 32 after recording stops, a linking loss area is generated between the written data and the previously recorded audio/video data in the sub data region 32b. However, the present invention employs a dummy chunk 32a to cover the linking loss area therein, such that the linking loss area cannot destroy the accuracy of the entire AVI format. Further, in an embodiment, the identifier of the dummy chunk 32a is a four-character code "JUNK". When a play program or a player finishes reading the header of the MOVI list 32, the dummy chunk 32a is skipped when the identifier of the dummy chunk 32a read is "JUNK", and thus the first A/V chunk in the MOVI list 32 is read. Definitely, the identifier of the dummy chunk 32a can be another four-character code, as long as when the four-character code is read by the play program or player, the content of the data region of the dummy chunk 32a is ignored or skipped.

In view of the above, the present invention employs a dummy chunk in the AVI format. As a result, when data are written into the first list and the header of the second list after recording stops, the linking loss area generated between the written data and the previously recorded audio/video data are covered in the dummy chunk, thus maintaining the accuracy of the entire AVI format. The advantage of the method lies in that there is no need to restrict each recording length or reduce the compatibility of optical storage medium.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of real-time recording a file with an AVI format on an optical storage medium, wherein the optical storage medium is a write-once medium and employs a file system without multi-section record, the AVI format comprises a first list for storing header data and a second list for storing audio/video data, the second list comprises a header and a sub data region, and the length of sub data region is determined according to the length of audio/video data which is already recorded, the method comprising:

determining a length of a linking loss area generated between every continuous recording area according to types of the optical storage medium;

reserving a recordable area prior to the sub data region according to a length sum of the first list, the header of the second list and a dummy chunk, wherein a length of the recordable area is equal to the length sum, and a length of the dummy chunk is larger than that of the linking loss area;

starting recording the audio/video data, and writing the audio/video data which is already recorded into the sub data region before a stop of recording; and writing data of the first list, the header of the second list and the dummy chunk sequentially into the recordable area after the stop of recording.

2. The method as claimed in claim 1, further comprising:

calculating lengths of the second list and the AVI format after the stop of recording and before writing the audio/video data into the sub data region.

3. The method as claimed in claim 1, wherein the AVI format further comprises an index chunk for storing index data.

4. The method as claimed in claim 3, further comprising:
writing the index data into the index chunk following the sub data region, after the stop of recording and before writing the audio/video data into the sub data region.

5. The method as claimed in claim 4, further comprising:
calculating lengths of the second list and the AVI format after writing the index data into the index chunk and before writing the data into the sub data region.

6. The method as claimed in claim 1, wherein the optical storage medium is DVD+R or DVD-R.

7. The method as claimed in claim 1, wherein the file system is ISO 9660 or UDF file system.

8. The method as claimed in claim 1, wherein the dummy chunk comprising:
an identifier for ignoring the content of dummy chunk.

9. The method as claimed in claim 1, wherein an identifier of the dummy chunk is a four-character code "JUNK".

10. An optical storage medium for real-time recording a file with an AVI format, wherein the optical storage medium is a write-once type medium and employs a file system without multi-section record, such that a linking loss area is generated between every continuous recording area of the optical storage medium, and the AVI format comprises:
a first list for storing header data related to audio/video data; and
a second list comprising a header, a dummy chunk and a sub data region, wherein the length of dummy chunk is larger than the length of linking loss area, and the sub data region is used to store the audio/video data which is already recorded,
wherein the first list is previous to the second list, the header of the second list is previous to the dummy chunk of the second list, and the dummy chunk of the second list is previous to the sub data region of the second list.

11. The optical storage medium as claimed in claim 10, wherein the AVI format further comprises:
an index chunk for storing index data related to the audio/video data, and the index chunk is following the second list.

12. The optical storage medium as claimed in claim 10, wherein the optical storage medium is DVD+R or DVD-R.

13. The optical storage medium as claimed in claim 10, wherein the file system is ISO 9660 or UDF file system.

14. The optical storage medium as claimed in claim 10, wherein the dummy chunk including:
an identifier for ignoring the content of dummy chunk.

15. The optical storage medium as claimed in claim 10, wherein an identifier of the dummy chunk is the four-character code "JUNK".

16. The optical storage medium as claimed in claim 10, wherein the length of the dummy chunk is larger than or equal to a length of an identifier field plus the length of linking loss area.

17. The optical storage medium as claimed in claim 14, wherein the identifier is a four-character code.

* * * * *